(12) United States Patent
Bonner et al.

(10) Patent No.: US 9,773,268 B2
(45) Date of Patent: Sep. 26, 2017

(54) SYSTEM OF ACQUIRING SHOPPER INSIGHTS AND INFLUENCING SHOPPER PURCHASE DECISIONS

(75) Inventors: Brett Bracewell Bonner, New Richmond, OH (US); Titus Arthur Jones, Hebron, KY (US); Gregory Michael Menz, Cincinnati, OH (US); John Edward Osborne, II, Indian Springs, OH (US); Dion Brent Perkins, Cincinnati, OH (US); Christopher Todd Hjelm, Cincinnati, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 1021 days.

(21) Appl. No.: 12/481,816

(22) Filed: Jun. 10, 2009

(65) Prior Publication Data

US 2009/0313089 A1    Dec. 17, 2009

Related U.S. Application Data

(60) Provisional application No. 61/061,662, filed on Jun. 16, 2008, provisional application No. 61/110,202, filed on Oct. 31, 2008.

(51) Int. Cl.
| | | |
|---|---|---|
| *G06Q 30/00* | (2012.01) | |
| *G06Q 30/06* | (2012.01) | |
| G06Q 30/02 | (2012.01) | |

(52) U.S. Cl.
CPC ..... *G06Q 30/0623* (2013.01); *G06Q 30/0217* (2013.01); *G06Q 30/0224* (2013.01);
(Continued)

(58) Field of Classification Search
CPC .................................. G06Q 30/0601–30/0645
(Continued)

(56) References Cited

U.S. PATENT DOCUMENTS

| | | | |
|---|---|---|---|
| 4,973,952 A | 11/1990 | Malec et al. | |
| 5,502,636 A * | 3/1996 | Clarke | 705/7.33 |

(Continued)

FOREIGN PATENT DOCUMENTS

| | | |
|---|---|---|
| CN | 101542548 A | 9/2009 |
| EA | 200970003 A1 | 4/2009 |

(Continued)

OTHER PUBLICATIONS

Gilbert Fuchsberg Staff Reporter of The Wall,Street Journal. (Jan. 30, 1990). Hand-held computers help field staff cut paper work and harvest more data. Wall Street Journal (1923—Current File) Retrieved from https://search.proquest.com/docview/135497283?accountid=14753.*

(Continued)

*Primary Examiner* — Resha Desai
(74) *Attorney, Agent, or Firm* — Pillsbury Winthrop Shaw Pittman LLP (57) ABSTRACT

Systems herein relate to acquiring shopper insights from home product use and influencing shoppers to make additional future purchases of products. Further, the invention relates to electronically communicating with the shopper at the second moment of truth to provide the shopper with one or more influential messages including, but not limited to product information, e-coupons, discounts, surveys, ingredients, ingredient suggestions, recipe suggestions, entertaining, consumer reports, shopping list suggestions, wish list suggestions, and inventory list suggestions.

20 Claims, 4 Drawing Sheets

(52) U.S. Cl.
CPC ..... *G06Q 30/0254* (2013.01); *G06Q 30/0255* (2013.01); *G06Q 30/0603* (2013.01); *G06Q 30/0641* (2013.01); *G06Q 30/02* (2013.01)

(58) Field of Classification Search
USPC .................................. 705/26, 27, 26.1–27.2
See application file for complete search history.

(56) References Cited

U.S. PATENT DOCUMENTS

| | | | |
|---|---|---|---|
| 5,918,211 | A | 6/1999 | Sloane |
| 5,995,015 | A | 11/1999 | DeTemple et al. |
| 5,999,908 | A | 12/1999 | Abelow |
| 6,199,753 | B1 | 3/2001 | Tracy et al. |
| 6,298,348 | B1 | 10/2001 | Eldering |
| 6,587,835 | B1 | 7/2003 | Treyz et al. |
| 6,659,344 | B2 | 12/2003 | Otto |
| 6,837,436 | B2 | 1/2005 | Swartz et al. |
| 6,931,254 | B1 | 8/2005 | Egner et al. |
| 6,963,848 | B1* | 11/2005 | Brinkerhoff ............... 705/7.32 |
| 7,054,647 | B2 | 5/2006 | Inaba et al. |
| 7,162,437 | B2 | 1/2007 | Shaak et al. |
| 7,263,378 | B2 | 8/2007 | Inselberg |
| 7,301,455 | B2 | 11/2007 | McKenna et al. |
| 7,308,254 | B1 | 12/2007 | Rissanen |
| 7,413,121 | B2 | 8/2008 | Goel et al. |
| 7,493,368 | B2 | 2/2009 | Raverdy et al. |
| 7,504,937 | B2 | 3/2009 | McKenna et al. |
| 7,873,543 | B2 | 1/2011 | Perrier et al. |
| 7,966,228 | B2 | 6/2011 | Perrier et al. |
| 8,001,015 | B2 | 8/2011 | Perrier et al. |
| 2001/0037206 | A1 | 11/2001 | Falk et al. ................ 705/1.1 |
| 2001/0044743 | A1 | 11/2001 | McKinley et al. |
| 2002/0016750 | A1* | 2/2002 | Attia ........................... 705/26 |
| 2003/0217137 | A1 | 11/2003 | Roese et al. |
| 2004/0229558 | A1 | 11/2004 | Johnson |
| 2004/0235460 | A1* | 11/2004 | Engstrom et al. ......... 455/414.1 |
| 2004/0235468 | A1 | 11/2004 | Luebke et al. |
| 2005/0021704 | A1 | 1/2005 | Larson et al. |
| 2006/0181458 | A1 | 8/2006 | Niu |
| 2006/0289637 | A1 | 12/2006 | Brice et al. |
| 2006/0293779 | A1 | 12/2006 | Nishri |
| 2007/0063837 | A1 | 3/2007 | McKenna et al. |
| 2007/0192161 | A1 | 8/2007 | Kogan et al. |
| 2007/0210155 | A1 | 9/2007 | Swartz et al. ............. 235/383 |
| 2007/0250613 | A1 | 10/2007 | Gulledge |
| 2007/0283004 | A1 | 12/2007 | Buehler |
| 2008/0030319 | A1 | 2/2008 | McKenna et al. |
| 2008/0040219 | A1 | 2/2008 | Kim et al. |
| 2008/0041942 | A1 | 2/2008 | Aissa |
| 2008/0065460 | A1 | 3/2008 | Raynor |
| 2008/0149710 | A1 | 6/2008 | Silverbrook et al. |
| 2008/0170580 | A1 | 7/2008 | Goldman et al. |
| 2008/0189170 | A1 | 8/2008 | Ramachandra |
| 2008/0203161 | A1 | 8/2008 | Goel et al. |
| 2008/0228600 | A1 | 9/2008 | Treyz et al. |
| 2008/0313938 | A1 | 12/2008 | Sonnendorfer et al. |
| 2009/0017764 | A1* | 1/2009 | Bonner et al. .............. 455/66.1 |
| 2009/0106085 | A1* | 4/2009 | Raimbeault .................. 705/10 |
| 2009/0125377 | A1 | 5/2009 | Somji et al. |
| 2009/0192893 | A1 | 7/2009 | Eldarkhanova et al. |
| 2009/0240571 | A1 | 9/2009 | Bonner et al. |
| 2010/0057541 | A1 | 3/2010 | Bonner et al. |
| 2011/0169715 | A1 | 7/2011 | Goel et al. |

FOREIGN PATENT DOCUMENTS

| | | |
|---|---|---|
| JP | 04-372098 | 12/1992 |
| JP | 08-290774 | 11/1996 |
| JP | H09-132146 A | 5/1997 |
| JP | 11-152041 | 6/1999 |
| JP | 2001-230876 | 8/2001 |
| JP | 2002-272399 | 9/2002 |
| JP | 2005-292909 A | 10/2005 |
| JP | 2006-198431 | 8/2006 |
| JP | 2006-524529 | 11/2006 |
| JP | 2007/300572 | 11/2007 |
| KR | 10-2004-0047249 A | 6/2004 |
| KR | 10-2005-0032663 | 4/2005 |
| KR | 10-0597164 B1 | 7/2006 |
| KR | 10-0770144 B1 | 10/2007 |
| KR | 10-0788955 B1 | 12/2007 |
| RU | 2162245 | 1/2001 |
| RU | 2164039 C1 | 3/2001 |
| RU | 2311682 C1 | 11/2007 |
| RU | 2358282 | 6/2009 |
| RU | 2432285 C2 | 1/2010 |
| RU | 2381556 C2 | 2/2010 |
| WO | WO-01/63507 A1 | 8/2001 |
| WO | WO 01/74101 A1 | 10/2001 |
| WO | 03/075125 | 9/2003 |
| WO | WO 2004/096050 | 11/2004 |
| WO | 2006137065 A2 | 12/2006 |
| WO | 2007/002941 | 1/2007 |
| WO | WO 2009/091553 | 7/2009 |
| WO | WO 2009/091554 | 7/2009 |

OTHER PUBLICATIONS

Office Action issued in Japanese Patent Application No. 2011-500817, mailed Mar. 2, 2011, pp. 1-2.
Georgian Search Report and Documentary Conclusion as issued for Georgian Patent Application No. AP 2009 012240, dated Oct. 25, 2012.
Georgian Search Report and Documentary Conclusion as issued for Georgian Patent Application No. AP 2009 012241, dated Nov. 6, 2012.
Georgian Search Report as issued for Georgian Patent Application No. AP 2009 012006, dated Oct. 10, 2012.
Office Action as issued for Chinese Patent Application No. 2009801022876, dated Oct. 19, 2012.
Office Action as issued in Russian Patent Application No. 2009126663, dated Feb. 6, 2012.
Search Report and Documentary Conclusion as issued for Georgian Patent Application No. 11919/01, dated Apr. 4, 2012.
Search Report and Documentary Conclusion as issued for Georgian Patent Application No. 11882/01, dated May 2, 2012.
First Office Action as issued for Chinese Patent Application No. 200980110318.2, dated Apr. 6, 2012.
International Search Report and Written Opinion of the International Searching Authority as issued for International Application No. PCT/US2011/044000, dated Dec. 16, 2011.
Office Action issued for Russian Patent Application No. 2010142931, dated Apr. 18, 2013.
Notice to File a Response as issued in Korean Patent Application No. 10-2009-0063928, dated Nov. 5, 2015.
First Office Action as issued in Chinese Patent Application No. 201180044684.X, dated Dec. 30, 2015.
Notice of Reasons for Rejection as issued in Japanese Patent Application No. 2013-519826, dated Mar. 8, 2016.
Office Action as issued in Canadian Patent Application No. 2,741,659, dated Jan. 29, 2016.
Office Action as issued in Canadian Patent Application No. 2,741,654, dated Feb. 9, 2016.
Office Action as issued in Canadian Patent Application No, 2,719,194, dated May 11, 2016.
Office Action as issued in Australian Patent Application No. 2011279131, dated May 27, 2016.
Notice to File a Response as issued in Korean Patent Application No. 10-2011-7012499, dated Aug. 4, 2016.
Second Office Action as issued in Chinese Patent Application No. 201180044684.X, dated Aug. 24, 2016.
Office Action as issued in Canadian Patent Application No. 2,741,654, dated Dec. 15, 2016.
Office Action as issued in European Patent Application No. 09823940.3, dated Apr. 25, 2017.

* cited by examiner

SYSTEM OF ACQUIRING SHOPPER INSIGHTS AND INFLUENCING SHOPPER PURCHASE DECISIONS

CLAIMS PRIORITY TO RELATED APPLICATIONS

This patent application cross references and claims priority to U.S. Provisional Patent Application 61/061,662 filed on Jun. 16, 2008 and U.S. Provisional Patent Application 61/110,202 filed on Oct. 31, 2008, which are both incorporated by reference in full herein.

FIELD OF THE INVENTION

The present invention relates to systems of acquiring shopper insights upon use of purchased products from a store. More specifically, the present invention is in the technical field of shopping systems of acquiring shopper insights and of also influencing shoppers by receiving product feedback from shoppers and transmitting influential messages to shoppers after the shoppers have used and experienced a product. Influential messages may include, but are not limited to the following: offers, coupons, advertisements, consumer reports, dynamic pricing, recipes and all manner of inducements suitable for influencing shopper's future purchase decisions.

BACKGROUND OF THE INVENTION

Today, retailers and manufacturers have very little influence on a shopper's use of store-bought products. Also, these same retailers and manufacturers have few effective ways to acquire input from shoppers once a product has been purchased and taken out of a store. Thus, the store's ability to understand shoppers' use of a product, gage enjoyment thereof, and influence future purchasing decisions is limited. While the Internet is available for some degree of interaction between shoppers and their purchases, it is typically scatter shot and not directed to a shopper's specific purchases and use of those purchased products and not robust enough to interact with shoppers in a convenient, portable manner.

A retailer's and a supplier's need to influence shoppers do not end after a purchase is made, but continue after the point of sale. In order to encourage store loyalty and encourage shoppers to make purchases which increase stores' and suppliers' profit margins, stores and suppliers desire economic and effective methods to influence shoppers after shoppers have interacted with products or taken products home, to encourage shoppers to purchase the products on a continuing basis. Consequently, stores and suppliers often provide coupons at the point of sale.

Today, shoppers are often overwhelmed with numerous misdirected, non-specific buying options and advertisements encouraging them to purchase products that may or may not be relevant to a shopper's specific shopping profile. Retailers and packaged goods manufacturers often overwhelm shoppers with volumes of information attempting to influence their choice of which product to purchase. Sales promotions can encompass a wide variety of different actions and procedures designed to stimulate product sales. Sales promotion include, for example, in-store purchase suggestions from sales clerks, limited-time price reductions on items, in-store announcements of products over public address systems, coupons distributed in a store to shoppers or distributed via newspaper and magazine inserts to readers for future redemption with a purchase, and more sophisticated multimedia programs presented over special display kiosks that display or play to passing shoppers. Decisions on particular sales promotions to be employed are frequently made as part of a national or regional marketing campaign in which data concerning sales trends are studied to discern patterns that help in the sales promotion decision. Often, the sales promotion to be used at a particular store and the time at which the promotion will be used are left to management at each store or to individual sales clerks and other store personnel.

Currently, coupons distributed at the point of sale are not targeted to individual shoppers based upon specific needs, wants or shopping history and are generally of the traditional paper type. The approach presents several problems. First, coupons may not influence shoppers to purchase products because shoppers may not use the products for which they are receiving coupons. Second, because the coupons are paper, they are easy to lose or damage. Third, because the coupons are on paper, shoppers must keep track of the expiration dates of each coupon and plan trips to the store accordingly.

Therefore, what is needed is a system that 1) interacts with a shopper before, during or after a shopper's use of a purchased product, 2) collects information from shoppers about their personal use of purchased products during or after the time of use, and 3) influences shoppers with influential messages tailored to specific shoppers and delivered to shoppers prior to or at the moment when a shopper considers a product purchase and considers which store to make a purchase. What is also needed is a method of electronic delivery of such influential messages for improved organization of the influential messages and, if applicable, the expiration dates of the discount offers contained in the influential messages.

SUMMARY OF THE INVENTION

Accordingly, the invention provides a system of tracking a shopper's use of purchased products in a store. The system comprises a shopper profile for each shopper that uses the system, an out-of-store communication network that has an Internet connection, a wireless end device attachable to the out-of-store communication network, and a commerce server that is in operative communication with the wireless end device through the Internet connection and through the out-of-store communication network. When the commerce server receives a shopper's feedback about the shopper's use of purchased products, the shopper's feedback is preferably, but not necessarily, transmitted from the wireless end device to the commerce server. In exemplary embodiments, the shopper profile is stored on the commerce server for storage and further treatment. Also, in exemplary embodiments, the commerce server transmits influential messages for influencing the shopper's future purchases.

In the system herein, the out-of-store communication network is located in a shopper's home, a shopper's place of business or any other place that is outside of a store and that is in a locale, preferably, in which one or more purchased products can be used by the shopper or others.

In exemplary embodiments, the wireless end device comprises a scanning device that can scan and read readable media on a shopper's purchased product. Such readable media is of the machine readable type including, but not limited to, a barcode, UPC media, and the like. Upon scanning, the readable media is transformed and stored into an electronic information packet, which contains all of the relevant data from the readable media that was previously scanned by the shopper.

In another embodiment herein, the electronic information packet is stored on the wireless end device. Preferably, a wireless end device transmits the electronic information packet through the out-of-store communication network through the Internet and to the commerce server, where it is stored. said the stored electronic information packet is then transferred to the appropriate shopper profile. Shopper profiles are also stored on the commerce server.

Once stored in the appropriate shopper profile on the commerce server, a data management device, or some other suitable analytical device that is operatively attached to the commerce server, analyzes each electronic information packet to determine the opportunity to influence the shopper's future purchases. After such analysis, the commerce server selects one or more influential messages. After selection, the commerce server transmits one or more influential messages to the shopper in accordance with the shopper profile.

In exemplary embodiments, the one or more influential messages include content data selected from the group consisting of a competitive savings opportunity, a co-branding opportunity, a product warning, a product combination warning, a product review, recipe suggestions, a response to an historical progression, an alternative choice for product purchase, in-retail establishment directions to locate a product, an electronic coupon, and other types of suitable sales inducements. Such influential messages may take several forms and are not limited by their form of communication to a shopper. Such forms include, but are not limited to, text messages, videos, electronic photographs, illustrations, hyperlinks, audio messages and the like.

Also provided herein is a system of influencing a shopper's future purchases when a shopper provides feedback about the shopper's use of purchased products is provided to the system. This system comprises a shopper profile for each shopper that uses the system, an out-of-store communication network having an Internet connection, a wireless end device attachable to the out-of-store communication network, a commerce server that is in communication with the wireless end device through the Internet and through the out-of-store communication network, and a shopper influence engine operatively connected to the commerce server.

In practice, the commerce server receives the feedback about the shopper's use of purchased products. The shopper influence engine generates and transmits influential messages to the wireless end device used by the shopper. Ideally, the influential message influences the shopper's future purchases.

In an exemplary embodiment, each shopper is provided with a wireless end device to take out of a retail store for use at home or elsewhere. A wireless end device is an inexpensive, convenient tool for creating shopping lists and wish lists that allow the shopper to scan product labels of in-use and expended products at home and add or edit shopping lists on the wireless end device. In the systems provided herein, the shopper creates and edits shopping lists and inventory lists on the wireless end device, a home computer, a laptop, or some combination thereof.

Further provided herein is a system for building a shopper profile that includes the wireless end device, an organization device, and a shopper profile builder. The wireless end device includes a product scanning device configured to scan the labels of purchased products whereby each scanned label produces scanned product data for each scan. A wireless end device can also scan product coupons to produce a scanned coupon data. The organization device is configured to organize the scanned product data and the scanned coupon data. The shopper profile builder is configured for constructing a shopper profile. The shopper profile includes the scanned product data that is linked to the shopper. The shopper profile also includes the scanned coupon data for coupons scanned by a shopper.

Further included is a system for gaining a shopper's insight on purchased products at the second moment of truth that includes an out-of-store communication network having an Internet connection, a wireless end device attachable to the out-of-store communication network, a commerce server, and a store communication network. The wireless end device is configured to scan, generate, and transmit scanned data through the home communication network at the scanning of one or more product barcodes, i.e., readable media. The commerce server is in operative communication with the wireless end device through the Internet and through the out-of-store communication network. The store communication network is located about a store whereby the store communication network communicates with the wireless end device and the commerce server. In the system for gaining a shopper's insight on purchased products at the second moment of truth, at least one of the purchased products has at least one readable media. The readable media is scanned by the wireless end device, and at such scanning of the readable media, the commerce server generates at least one question for transmission to and display on the wireless end device.

Further embodiments, as well as the structure and operation of these embodiments, are described in detail below with reference to the accompanying drawings.

BRIEF DESCRIPTION OF THE DRAWINGS

While the specification concludes with claims particularly pointing out and distinctly claiming the invention, it is believed that the embodiments will be better understood from the following description in conjunction with the accompanying figures, in which like reference numerals identify like elements and in which:

DESCRIPTION OF THE REFERENCED NUMERALS

In reference to the drawings, similar reference characters denote similar elements throughout all the drawings. The following is a list of the reference characters and associated element:

7: Shopper
12: Wireless router
15: Wireless connection
17: Internet connection
18: Communication link
40: Wireless end device
90: Home
94: Commerce server
95: Store computer network
96: Internet

DETAILED DESCRIPTION OF THE INVENTION

The invention provides a system of tracking a shopper's use of purchased products in a store. The system comprises a shopper profile for each shopper that uses the system, an out-of-store communication network that has an Internet connection, a wireless end device attachable to the out-of-store communication network, and a commerce server that is in operative communication with the wireless end device through the Internet connection and through the out-of-store communication network. When the commerce server receives a shopper's feedback about the shopper's use of purchased products, the shopper's feedback is preferably, but not necessarily, transmitted from the wireless end device to the commerce server. In exemplary embodiments, the shopper profile is stored on the commerce server for storage and further treatment. Also, in exemplary embodiments, the commerce server transmits influential messages for influencing the shopper's future purchases. These influential messages are sent to the shopper's wireless end device at the second moment of truth.

In the system herein, the out-of-store communication network is located in a shopper's home. As used herein, the term "home" and "shopper's home" will include a shopper's actual home, a shopper's place of business, and other non-store locations. As used herein, the term "expended products" refers to purchased products used by a shopper.

The "second moment of truth" as used herein means the moment in time when a human being has used a purchased product and has at least a partially formed impression and/or opinion about the used product. The second moment of truth includes the time spent after interaction with a product and refers to the period of time directly after the shopper or a member of shopper's household has interacted with a product. Since shoppers in general do not typically use or otherwise interact with products in the store, the second moment of truth typically occurs in the home and at locations away from the store.

By the term "home computer" as used herein refers to any computing device located outside of the store which associates with the shopper's wireless end device. The term specifically includes personal desktop and laptop computers owned or used by the shopper, and advanced cell phones with a capacity for connecting to the Internet. Since the second moment of truth often occurs in the shopper's home, it is anticipated that the home computer will be physically located in the shopper's home. However, since the second moment of truth can occur at the workplace, the home computer can be physically located in the shopper's workplace.

The "home communication network" as used herein, means any communications network or group of networks positioned about the home and is capable of accessing the Internet. An exemplary embodiment of the home communication network is a communication multi-network. By the term "store communications network" it is meant, herein, a communications network in a store that comprises but is not limited to one or more of the following: routers for wireless and/or wired communication, one or more data management devices (e.g., switches), one or more computational devices (e.g., server grade computer, commerce server) and others. An exemplary store communication network is a multi-network of the type described in U.S. Ser. No. 11/859,703 filed on Sep. 21, 2007, U.S. Ser. No. 12/058,705 filed on Mar. 29, 2008, and U.S. Ser. No. 12/172,326 filed on Jul. 14, 2008, the substance of each patent application being included by reference in full herein.

By the term "multi-network" it is meant, herein, a communications network in a store comprising two or more dissimilar types of communication network types, two or more similar types of communication networks or some combination thereof.

The term "store" herein means all manner of retail environments in which the purchase of goods occurs and in which shoppers are physically present to purchase such goods including, but not limited to, grocery stores, convenience stores, clothing stores, consumer goods stores, specialty stores, manufacturing facilities, warehouses, open-air markets, and many other retail store types. Exemplary embodiments include a store communication network located within or about the store, whereby the store communication network is capable of communicating with the out-of-store communication network. Preferably, a commerce server herein is operatively attached to at least one store communication network. Exemplary systems are adapted for the wireless end devices to be used in both the out-of-store communication network and the store communication network for communication with the one or more commerce servers.

By the term "commerce server" it is meant, herein, one or more store computers, preferably server-grade, that can be alternately located within a store or outside of a store. The commerce server comprises one or more electronic devices, for example, a series of server grade computers, operated by the store or the supplier, depending on the embodiment. In exemplary embodiments, the commerce server is operated by the store and positioned within the store. In alternative exemplary embodiments, the commerce server is not positioned within the store, but is in communication with one or more store communication networks.

In exemplary embodiments, the wireless end device comprises a product scanning device that can scan and read readable media located on purchased products. Such readable media is of the machine readable type, including but not limited to, a barcode, UPC media, and the like. Upon scanning the readable media is transformed and/or stored into an electronic information packet, such electronic information packet containing all of the relevant data from the readable media that was previously scanned by the shopper.

In another embodiment herein, the electronic information packet is stored on the wireless end device. Preferably, a wireless end device transmits the electronic information packet through the out-of-store communication network through the Internet and to the commerce server, where the electronic information packet is stored on the commerce server. Once stored on the commerce server, each said electronic information packet is assigned to the appropriate shopper profile.

Once stored in the appropriate shopper profile on the commerce server, the commerce server, or some other suitable analytical device that is operatively attached to the commerce server, analyzes each electronic information packet to determine the opportunity to influence the shopper's future purchases. After such analysis, the commerce server selects one or more influential messages. After selection, the commerce server transmits one or more selected influential messages to the shopper in accordance with the shopper profile.

In exemplary embodiments, the one or more influential messages include content data selected from the group consisting of a competitive saving opportunity, a co-branding opportunity, a product warning, a product combination warning, a product review, a response to a historical progression, an alternative choice for product purchase, in-retail establishment directions to locate a product, an electronic coupon, and/or another type of suitable sales inducement.

Such influential messages may take several forms and are not limited by their form of communication to a shopper. Such forms include, but are not limited to, text messages, videos, electronic photographs, illustrations, hyperlinks, audio messages, and the like.

Also provided herein is a system of influencing a shopper's future purchases when a shopper provides feedback about the shopper's use of purchased products is provided to the system. This system comprises a shopper profile for each shopper that uses the system, an out-of-store communication network having an Internet connection, a wireless end device attachable to the out-of-store communication network, a commerce server that is in communication with the wireless end device through the Internet and through the out-of-store communication network, and a shopper influence engine operatively connected to the commerce server.

In practice, the commerce server receives the feedback about the shopper's use of purchased products. The shopper influence engine generates and transmits influential messages to the wireless end device used by the shopper. Ideally, the influential message influences the shopper's future purchases through inducements to purchase through inducements to purchase.

In an exemplary embodiment, each shopper is provided with a wireless end device to take out of a retail store for use at home or elsewhere. A wireless end device is used for creating shopping lists and wish lists that allow shoppers to scan product labels of in-use and expended products at home and add or edit shopping lists on a wireless end device or a computer at any time.

Further provided herein, is a system for building a shopper profile that includes a wireless end device, an organization device, and a shopper profile builder. The wireless end device includes a product scanning device configured to scan the labels of purchased products whereby each scanned label produces scanned product data for each scan. A wireless end device herein can also scan readable media located on product coupons to produce a scanned coupon data. The organization device is configured to organize the scanned product data and the scanned coupon data. The shopper profile builder is configured for constructing a shopper profile. The shopper profile includes the scanned product data that is linked to the shopper. The shopper profile also includes the scanned coupon data for coupons scanned by a shopper.

Further included is a system for gaining a shopper's insight on purchased products at the second moment of truth that includes an out-of-store communication network having an Internet connection, a wireless end device attachable to the out-of-store communication network, a commerce server, and a store communication network. The wireless end device is configured to scan, generate, and transmit scanned data through the out-of-store communication network at the scanning of readable media. The commerce server is in operative communication with the wireless end device through the Internet and through the out-of-store communication network. The store communication network located about a store whereby the store communication network communicates with the wireless end device and the commerce server. In the system for gaining a shopper's insight on purchased products at the second moment of truth, at least one of the purchased products has at least one readable media. The readable media is scanned by the wireless end device, and at such scanning of the readable media, the commerce server generates at least one question for transmission to and display on the wireless end device.

In exemplary embodiments, the home comprises a home communication network, which is a communications network for communication between a wireless end device and other devices such as home computers, which are communicatively coupled to a commerce server. A home communication network includes "out-of-store communication networks". In exemplary embodiments, the wireless end device is mobile and is therefore not bound for use in one location, whether in the home or a store.

A preferred commerce server herein includes a computer readable memory and a store processing system configured to be communicatively coupled to the computer readable memory. The store processing system includes a program code stored in the computer readable memory configured to receive, organize and distribute electronic information pertinent to the business of running the store. It is noted herein, however, that a commerce server of the type discussed does not necessarily have a store processing system in order to be operative within the systems discussed herein.

In exemplary embodiments, the commerce server operates from a centralized location housing many high power and high speed computational devices that can receive, manage, and transmit electronic data from many wireless end devices to and from many store communication networks. However, in other embodiments, one or more commerce servers are not centrally located, but are located regionally so that a group of one or more commerce servers can serve a region of stores. Lastly, exemplary embodiments include the one or more commerce servers that are located within the store and manage data for a single store.

Exemplary embodiments described herein provide for systems of tailoring the influential message, for example, an e-coupon, to specific shoppers and delivering the influential message directly to the wireless end device used by the shopper in the home and in the store. Consequently, the present systems and methods reduce or even eliminate the unnecessary step previously conducted by the shopper of searching through a multitude of paper and electronic files for a coupon that meets the shopper's personal interests and needs. Moreover, exemplary embodiments provide a means for the shopper to electronically organize the e-coupons and to avoid the cumbersome task of printing the e-coupons and remembering to bring them to the store for redemption.

The systems herein allow a shopper to take a wireless end device herein to a store having a compatible store communication network after receiving and storing the influential messages, including the e-coupons, at the second moment of truth, which is likely experienced at home. After shopping in the store with the wireless end device, when the shopper is ready to check out, the shopper electronically redeems the e-coupons accessed through the wireless end device. Thus, the systems and methods provided herein reduce or even eliminate the need to print the coupons received electronically.

What is contemplated herein is a variety of influential messages to be used to influence the shopper at the second moment of truth. The content of the influential messages includes but is not limited to the following: the form of recipe suggestions, suggested entries for the shopper's shopping list, e-coupons, targeted pricing of an item, alerts when a shopper has passed a product on his shopping list, a consumer report, a survey, a current pricing information, discounts, product reviews, competitive product offers, enhanced saving opportunities, co-branding opportunities, responses to historical progression of product selection, general product warnings, product warnings tailored to shopper profile (e.g., a shopper profile includes allergen data that someone in the shopper's family is allergic to peanuts, thus the influential message may be "The product you just selected was produced in a factory that handles peanuts."), combination product warnings (e.g., "We see that you purchased a prescription medication last week that may conflict with the prescription medication that you have selected to include on your shopping list, please consult your physician before taking two prescription medications."), health awareness alerts that provide specific product information such as sodium content or fat content, product and store surveys, internal maps on how to find products within the store, and other influential messages known in the art.

Importantly, the systems and methods disclosed herein are able to cull data related to the second moment of truth in order to generate shopper feedback on his use of the product previously purchased in the store. In exemplary embodiments, when the shopper scans the readable medium of the expended product with the wireless end device, an opportunity to rate the product appears within the wireless end device. In exemplary embodiments, at such scanning, the following sets of questions are asked of and answered by the shopper:

On a scale of 1 to 5, 5 being the highest, please rate your personal satisfaction with XYZ product.
On a scale of 1 to 5, 5 being the highest, please rate your household's satisfaction with XYZ product.
Is the use of this product a first use?
Is the use of this brand of product a first use?
Was the price of this product more or less expensive than you expected?
Will you purchase this product on your next shopping trip?

Persons of skill in the art will recognize that the above questions are merely exemplary. In fact, such persons will recognize that there are many more types of questions or requests for feedback that may be asked in response to input received from a shopper. In exemplary embodiments, the systems and methods herein facilitate the receipt of feedback from a shopper just after scanning of one or more expended products ready for discarding.

Figure 1:
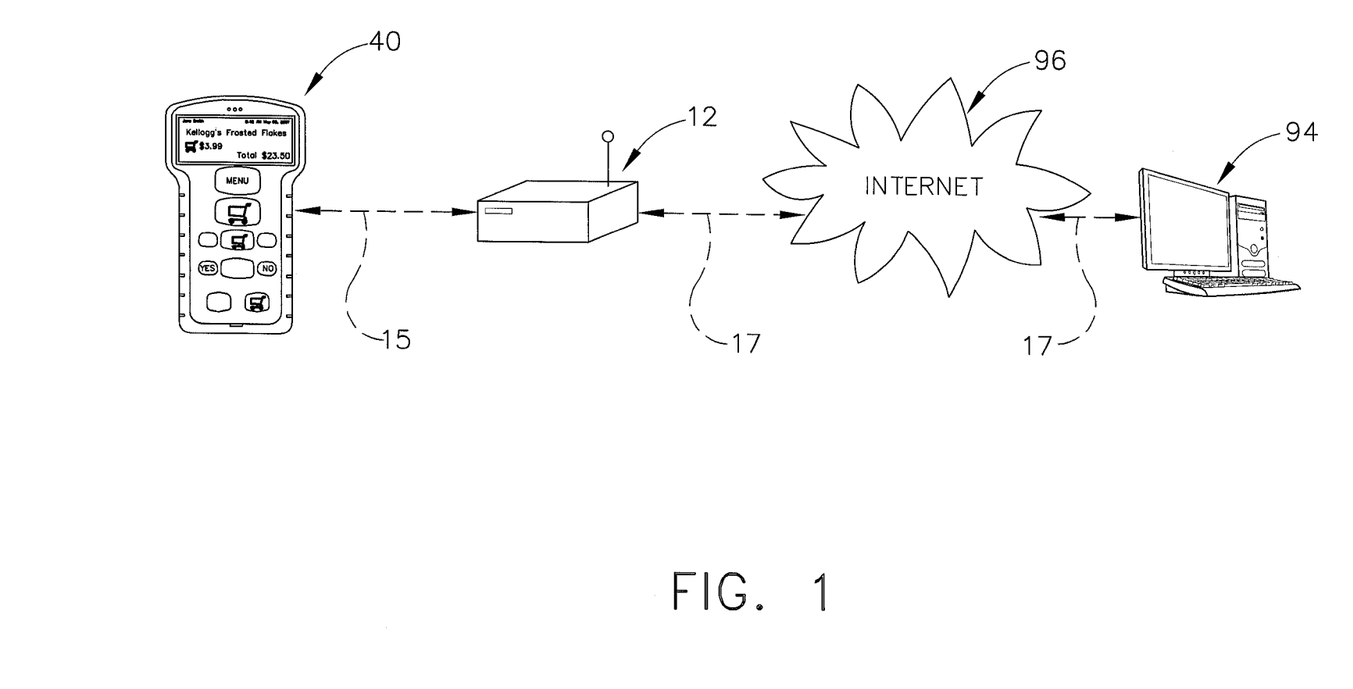
FIG. 1 provides a schematic of components for several systems herein.

FIG. 1 provides a schematic of the components for several systems herein. In particular, wireless end device 40 is provided. Wireless end device 40 is a store supplied wireless device that is usable in a store and outside of a store so long as there is a compatible out-of-store communication network, a wireless router to attach to electronically, or both. In fact, FIG. 1 shows a wireless connection 15 between wireless device 40 and wireless router 12.

In practice, wireless end device 40 is wirelessly attached to wireless router 12. Wireless router 12 is positioned in multiple locales outside of a store like a shopper's home, office, and other places. Persons of skill will recognize that the placement of wireless router 12 can be anywhere and applicable to the systems herein so long as wireless router 12 resides outside of a store and is not itself directly operatively attached to a store's computer or communication network.

In a preferred embodiment herein, wireless router 12 positioned within a shopper's home. Wireless router 12 serves to 1) be connected to the Internet through known means like an Ethernet connection, 2) transmit data to wireless end device 40, and 3) transmit data from wireless end device 40 to the Internet and on to one or more final destinations. Herein, the Internet serves as an information superhighway through which to transmit from and transmit to wireless end device 40. Once transmission through the Internet has occurred, commerce server 94 receives such data transmissions and stores it.

Commerce server 94 can be, but is not necessarily, the final point of destination of data transmitted by wireless end device 40. Data transmitted to commerce server 94 is stored. Where shopper 7 has a shopper profile created and stored on commerce server 94, data transmitted to commerce server 94 from wireless end device 40 is attached to a shopper's particular shopper profile. Additionally, data stored on commerce server 94 can be analyzed by one or more analytical engines like an influencing engine (not shown).

The commerce server 94 is preferably a server grade computer like those made and sold by such companies as DELL®, IBM®, HP®, COMPAQ® and the like. Persons of skill in the art will be well familiar with such server grade computers made by any one of the foregoing companies and others not specifically mentioned herein.

Influencing engine herein is a computer program that determines, statistically, the most appropriate one or more influential messages to send to a particular shopper 7. Influencing engine, in making such a determination, regards one or more of the following data points: a shopper profile (i.e., a shopper inputted register of likes, dislikes, wants, needs, location, family household data, shopping patterns, and other information specific to a given shopper 7); product information (e.g., cost, availability, store inventory, competitive assessment, ingredient list and other information specific to a given product for purchase); regulatory information; scanned product data from a shopper's use of a product; and feedback data provided by shopper 7 or by members of shopper 7's household.

Influencing engine operates by reviewing substantially all of the data points about the shopper 7 and/or shopper 7 household's use of purchased products and then assigning statistical weight to each data point. Once assigned, influencing engine then calculates the percentages of likelihood of re-purchase of a previously purchased product and/or the percentages of likelihood of purchase of a new product given feedback about previously purchased product. Product competitor information is also available to influencing engine so that a competitor's offer for product purchase (i.e., a sales inducement) can be transmitted to shopper 7 as an influencing message.

Figure 2:
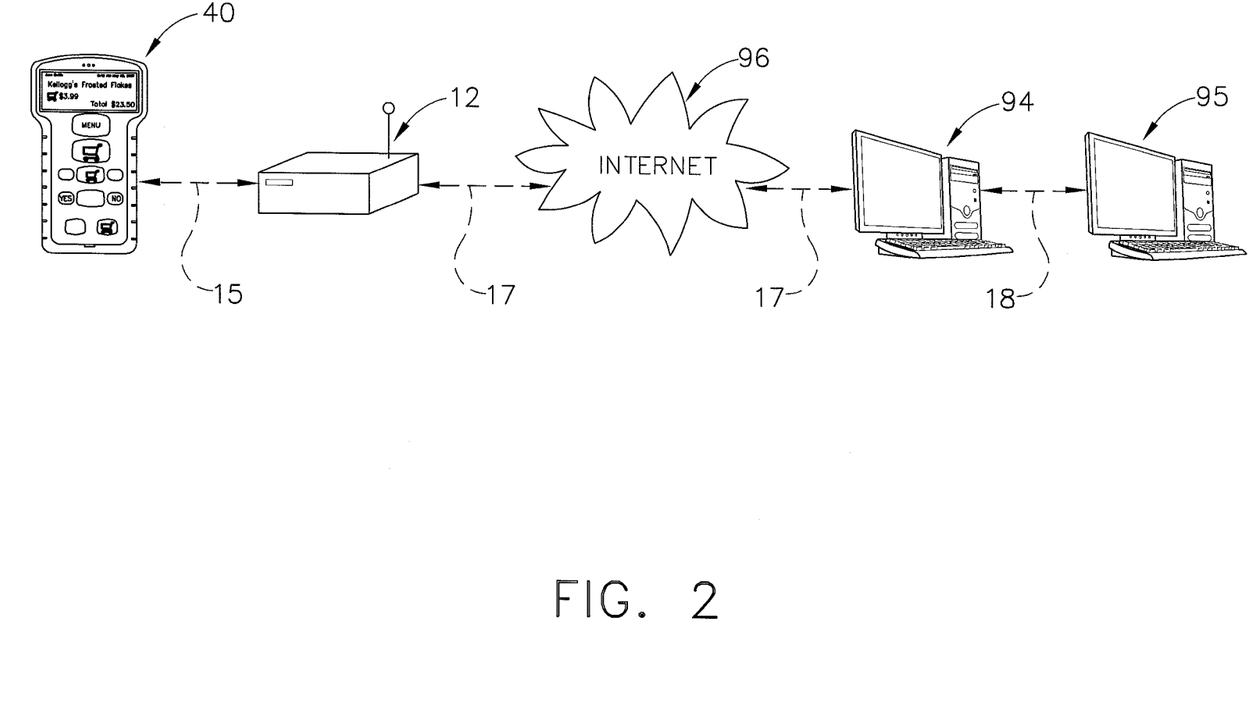
FIG. 2 provides a schematic of components of an exemplary embodiment of the system herein.

In FIG. 2, store computer network 95 is operatively attached to commerce server 94 either wirelessly or in a wired fashion by, for example, Ethernet cable. A store computer network 95 can be actually separate from commerce server 94 but not necessarily. Alternatively, commerce server 94 can be housed in the one or more computers that make up the store computer network 95 in a store or it can be its own device or devices positioned outside of the store but operatively attached to the store computer network 95. Either configuration noted herein is suitable for the operation of the systems and is at the discretion of the respective system operators.

Figure 3:
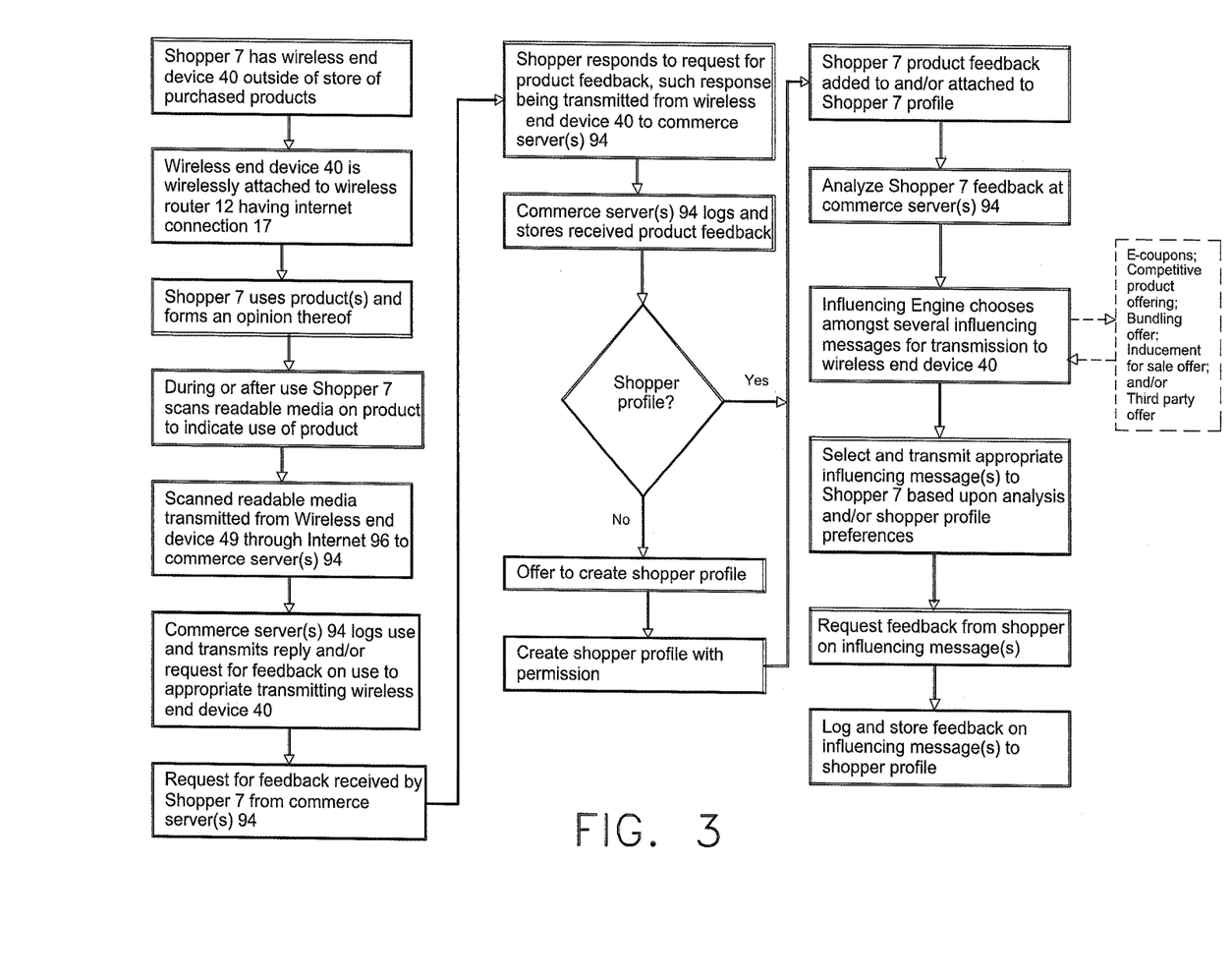
FIG. 3 provides a flowchart schematic of the operability of one or more systems herein.

FIG. 3 provides a flowchart schematic of the operability of one or more systems herein. Three important ingredients for operability to any of the systems discussed and claimed herein are 1) at least one wireless end device 40 for use by a shopper and/or members of a shopper's household, 2) attachment of wireless end device 40 to wireless router 12 so that information may be freely transmitted and received by wireless end device 40, and 3) shopper's use of purchased products about which shopper 7 may provide feedback and receive influential messages for future purchases of the same, similar or different products.

Figure 4:
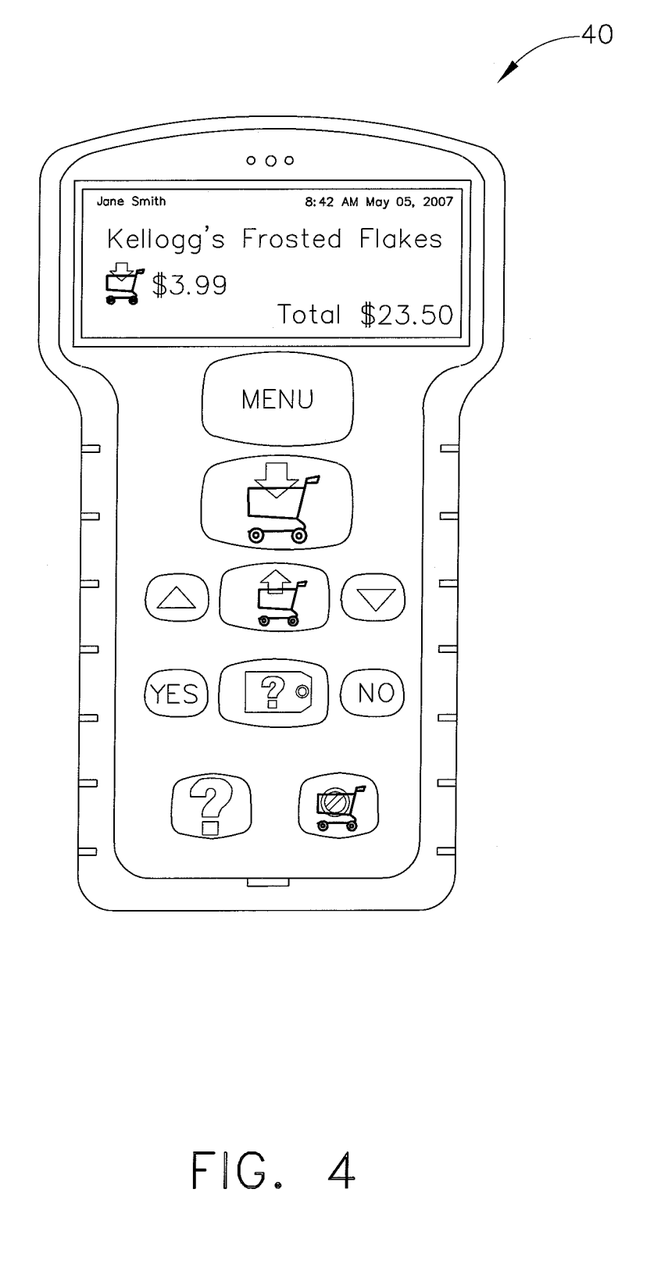
FIG. 4 provides a schematic of an exemplary embodiment of the wireless end device.

In practice, shopper 7 brings wireless end device 40, preferably, into his home along with purchased products. Once entering the home, wireless end device 40 attaches, electronically, to wireless router 12 and is now able to transmit and receive information or data through the Internet to one or more commerce servers 94. As shown in FIG. 4, shopper 7 scans the readable media on a product, preferably, as a product is being used and consumed.

Once the readable media has been scanned it is either immediately transferred to a commerce server 94, stored on wireless end device 40 as an electronic data packet, or both. The treatment of scanned data at this point depends upon several factors including, but not limited to, the storage capacity on wireless end device 40, data transmission rates between wireless end device 40 and commerce server 94, and the most efficient use of resources within the system. Persons of skill in the art will understand that the immediate treatment of scanned data from product readable media is at the discretion of a system operator and can be decided based upon optimal efficiency conditions of the systems herein.

When scanned readable media data is transmitted to commerce server 94 it is there logged, stored and assigned to the particular wireless end device 40 from which received. At such time, commerce server 94 also assesses whether a shopper profile exists for the user of wireless end device 40. If a shopper profile is associated with a particular wireless end device 40 from which data has been received, data transmitted to commerce server 94 is assigned to shopper 7's shopper profile. Once assigned, transmission of data to commerce server 94 begins to be analyzed by influencing engine for treatment and possible transmission of influential messages transmitted back to shopper 7 and presented on wireless end device 40.

As noted hereinabove, the influencing engine herein is a software program capable of analyzing shopper 7 transmitted data that includes but is not limited to information about products, their use, shoppers' opinion of such products, likelihood of re-purchase and more.

When shopper 7 has used a purchased product, he is experiencing a second moment of truth—i.e., a formed opinion or impression of a product during the time or just after a product's use. At the moment that the scanned data of an expended product is created, commerce server 94 recognizes that the shopper 7 is experiencing a second moment of truth. In exemplary embodiments, at that moment, influencing engine prompts shopper 7 to supply feedback with respect to product use. Once that feedback is received, influencing engine further assesses what additional influential messages to provide shopper 7 to influence his future purchases. By such process, the shopper 7 has the opportunity to decide whether the product is something that is worth replacing. Traditionally, at these moments of time the shopper makes a mental or a handwritten note to purchase a replacement for the expended product. In contrast, the systems and methods provided herein, provide the shopper with an efficient and convenient system and method for creating the shopping list to purchase replacements of the expended products.

Because most modern stores are able to delineate between purchased products purchased at the store from products purchased at competing stores, the store is provided valuable shopper preference data concerning shopper and his buying habits. In exemplary embodiments, the shopper preference data is received by the commerce server and is ultimately transmitted through the store computer network for final storage and processing.

The shopper preference data is beneficial to stores, merchandisers, manufacturers and advertisers because they each have the opportunity to substantially immediately influence shopper 7 to purchase products at store by providing information or incentives in order to optimize or maximize a shopper's purchasing decisions. Ideally, the influential messages received by shopper 7 through wireless end device 40 have an influential effect on the shopper. Alternatively, shopper chooses to ignore the influential messages and thereby avoids being influenced.

In exemplary embodiments, the store influences shopper 7 at the second moment of truth by displaying an advertisement on wireless end device 40. This method of advertising is particularly valuable for stores, merchandisers, advertisers and manufacturers, because the advertised products are likely to be chosen for purchase. The reason the advertised products are likely to be chosen for purchase is that the advertisements are tailored to the individual shoppers 7 by basing the content of the advertisement upon (1) the shopper's past preferences, (2) previously purchased products, or (3) the recently scanned readable media, or some combination of the three factors.

In exemplary embodiments, a store encourages shopper 7 to repurchase the same product from the store. In addition to or in alternative embodiments, commerce server 94 suggests a similar product which would increase the profit margin of the store. In exemplary embodiments, the shopper 7 adds the advertised item to the shopping list or wish list.

In the exemplary embodiments herein, store and/or its partners influences shopper 7 at the second moment of truth by transmitting from commerce server 94 an influential message, in the form of an advertisement, an e-coupon, a consumer report that favors the store over the competing stores, or some similar suggestive message, to the wireless end device 40. Ideally, an influential message herein encourages the shopper to buy the replacement of an expended product from a particular store rather than the competing stores. In the exemplary embodiments described herein a store and/or its partners influences shopper 7 at the second moment of truth by suggesting complementary additional products to add to the shopping list.

For example, a store and/or its partners influences shopper 7 at the second moment of truth by sending one or more e-coupons to wireless end device 40 used by the shopper. This method of influencing shopper 7 at the second moment of truth is particularly effective, because the store has targeted individual items for shopper 7 based on the shopper preference data. Thus, shopper 7 is likely to follow a store's suggestions because shopper 7 has already expressed an interest in purchasing a replacement for expended products according to, for example, a shopper profile or electronic shopping list. If commerce server 94 has retained shopper 7's shopping list, a store and/or its partners can provide targeted discounts on specific items, quantities and/or brands for products having higher profit margins when compared with other products.

Besides receiving e-coupons for products the shopper is likely to purchase, the shopper benefits because wireless end device 40 offers the shopper a convenient mechanism to organize the e-coupons, and the knowledge of all of the e-coupons' expiration dates. What's more, the shopper benefits because he can easily access the e-coupons in the store while shopping, since the wireless end device is transportable and has the ability to access the store communication network.

The media of the influential messages can also be varied. For example, the influential message can be selected from at least the following forms: a text message, an illustration, a photograph, a video, an audio file, and an interactive message.

As a shopper experiences a second moment of truth outside of a store and preferably at home and transmits feedback thereof using the wireless end device 40, at least one commerce server transmits the influential messages to his wireless end device. The commerce server 94 not only transmits a wide variety of influential message types, it also tailors influential messages to an individual shopper's preference data which includes but is not limited to the following: (1) the dates and times the shopper has shopped in the past; (2) the date and time a shopper experienced a second moment of truth; (3) a shopper's general preferences already known to the store; (4) a shopper's personal preferences already known to the store; (5) a shopper's previous purchases; (6) a shopper's real time intended purchases as made known to the store by the scanning of product bar codes; (7) a shopper's shopping list; (8) a shopper's home inventory list; (9) the actual time period a shopper spends considering purchasing a particular product or class of products; (10) a shopper's inputted budget to spend on any one or several items; (11) the promotional prices (advertised or otherwise) currently in the store; (12) a shopper's previously staged electronic coupons or previously scanned paper coupons. Examples of a shopper's personal preferences include the shopper's requests for "health alerts" (ex: allergens) in his shopper profile, and the shopper's request for alerts to marked down individual packages due to close expiration dates for categories that they intend to purchase.

Exemplary embodiments benefit the shopper, the store and the supplier. Exemplary embodiments benefit the shopper by providing a more convenient shopping experience and an opportunity for the shopper to become better informed about the store and about the products that have a high probability of likelihood to be of interest to the shopper. The shopper is benefited by the convenience and organization of the at least one method of delivering influential messages, such as e-coupons, to the shopper in a way that is directed to the specific shopper's experience with products. The exemplary method of delivery of the influential messages ensures that the shopper is not bombarded with a multitude of irrelevant electronic content, but instead, influential messages are targeted to products that a shopper has either already considered purchasing or, with some probability, is likely to consider purchasing. A shopper is further benefited by the capabilities of the present invention, because the invention allows for a simplified method of creating organized shopping lists and wish lists.

The systems herein also benefit the store and the supplier by encouraging store and brand loyalty. Also, systems herein provide a store and/or a supplier with useful shopper preference data. Among other things, each purchase, each response, and each lack of response to each influential message contributes to the shopper preference data collected by the commerce server.

By implementing the exemplary embodiments, the store and the supplier have an improved means to influence the shopper. It is important that such systems enhance, simplify and expedite a shopper's experience with very little, if any, cost pass-through, resulting in higher store prices due to expensive end-user components and very little, if any, negative impact to a store's profit margin.

FIG. 4 provides a schematic of the exemplary embodiment of the wireless end device 40. The wireless end device is an electronic device, which operates wirelessly through a communication network. Herein, wireless end device 40 is a transportable handheld electronic device and is useful in a store for scanning and shopping and also use outside of a store, for example, in a shopper's home. In exemplary embodiments, the wireless end device is an advanced cell phone with a capacity for connecting to the Internet or a similar global communication link for data streaming. The systems described herein rely upon influential messages being provided to a shopper on the wireless end device. In exemplary embodiments, wireless end device 40 is configured to communicate through the out-of-store communication network through the Internet and to one or more commerce servers 94. In exemplary embodiments, wireless end device 40 is configured to communicate through the store communication network. In exemplary embodiments, wireless end device 40 is configured to communicate with the commerce server through a global communication link when the wireless end device is at home or non-store location.

In a compatibly equipped store, wireless end device 40 operates as a blind node within the store communication network. Wireless end device 40 is also an end node within the store communication network. The exemplary wireless end device can operate not only as a means to collect and organize the e-coupons, but also as a portable, virtual terminal for checkout from the store. An exemplary wireless end device is of the type described in U.S. Ser. No. 11/859,703 filed on Sep. 21, 2007, U.S. Ser. No. 12/058,705 filed on Mar. 29, 2008, and U.S. Ser. No. 12/172,326 filed on Jul. 14, 2008, the substance of each patent application being included by reference in full herein.

Exemplary embodiments of the wireless end device 40 house a display for reading or viewing influential messages received from an external server, such as the commerce server 94. Exemplary wireless end devices are equipped with a location tracking device and a product scanning device. The "product scanning device" as used herein means a device with the means of scanning or creating an image of a readable medium. An example of a product scanning device is an imager capable of both taking photographs and reading readable media.

In a preferred embodiment herein, the wireless end device 40 includes software for identifying and managing scanned data from each scanned readable medium of a product. In exemplary embodiments, the wireless end device 40 identifies each readable medium scanned with the product scanning device and stores each identity on the computer readable memory. Alternatively, the wireless end device 40 herein scans readable media on a product label and then transmits information from the scanned readable media as scanned product data to one or more commerce servers described hereinabove.

The wireless end device is suitable for use by the shopper in the store and in the home. The exemplary wireless end device 40 is configured to scan product readable media and to generate scanned data. The shopper creates shopper preference data on the wireless end device and/or a home computer. The shopper preference data includes the scanned data as well as voluntarily entered responses to questions presented to shoppers and other voluntarily provided information.

In exemplary embodiments, the wireless end devices 40 are fully functional devices. In such embodiments, the shopper preference data is recorded and stored onto the computer readable memory of the wireless end device. In alternative exemplary embodiments, the wireless end devices are reduced function devices. Herein, a "reduced function device" is a device comprising multiple interface keys, wherein the majority of the interface keys provide a requested transmission to or from the out-of-store communication network or store communication network instead of performing computational work within the housing of the wireless end device. Thus, the system provides for at least two configurations of the wireless end device: (1) wherein the wireless end device is a fully functional device and stores the influential messages in a computer readable memory housed within the wireless end device, and (2) wherein the wireless end device, as a reduced function device, operates as a portal to the electronic files saved in a computer readable memory housed within a commerce server or other data management device.

Regardless of type, the wireless end device 40 herein houses a transmission device for transmitting the scanned product data and the shopper preference data to external generic network devices, such as the commerce server 94, and the data management device.

In exemplary embodiments, the store communication network is a communication multi-network. The exemplary communication multi-network includes at least one mesh communication network and at least one star communication network. Working together, though not necessarily dependently, the mesh communication network and the star communication network enable a shopper to electronically communicate with the store. In an alternative exemplary embodiment of the communication multi-network, the communication multi-network includes two or more star communication networks positioned about the store to enable electronic communication between shoppers and the store. In an alternative exemplary embodiment of the communication multi-network, the communication multi-network includes two or more mesh communication networks positioned about the store to enable electronic communication between the shoppers and the store.

In exemplary embodiments, the store communication network comprises at least one data management device that collects the shopper preference data from the store communication network or the commerce server or both. In such embodiments, the data management device organizes each shopper preference data received from each shopper transmitting such information from each separate wireless end device from home so that each shopper's shopper preference data is separately filed and identified. Importantly, the data management device comprises software that manages all of the scanned data and the shopper preference data received from the wireless end device.

Advantageously, in exemplary embodiments, the data management device builds a shopping list for future purchases that is unique to the shopper and is created from the scanned data received from the wireless end device that is associated with the individual shopper. The term "shopping list" as used herein refers to any list which includes the shopper's plans or intentions to purchase a product in the future.

In exemplary embodiments, one or more shopping lists are created and edited either manually or by scanning the readable media of purchased products and expended products. At home, such scanning often occurs prior to the discarding of the expended products that have been fully used. Alternatively, such scanning occurs when the shopper stores recently purchased products at home in cabinets, a refrigerator, etc. In exemplary embodiments, the wireless end device 40 comprises software configured to populate the shopping list from the scanned data whereby said software directs the wireless end device to store the shopping list onto the memory of the wireless end device. In exemplary embodiments, the shopping list is created and edited by the shopper using a home computer and the wireless end device 40 in a variety of methods, including but not limited to the following: manually using a keyboard or touchpad; scanning the readable media of products; and by accepting suggestions from the store regarding products to place on the shopping list. In exemplary embodiments, the shopping list on the wireless end device 40 or on a home computer automatically accesses additional shopper preference data pertaining to the shopper which is stored in the computer readable memory of the shopper's wireless end device, the home computer, the commerce server, the data management device, or some combination thereof.

In one embodiment herein, the software on the commerce server triggers the appropriate time for transmission of information to the wireless end device. For instance, when the commerce server receives scanned data, the software on the commerce server is aware that there is a high probability that the shopper is experiencing or has experienced a second moment of truth. At such receipt, the commerce server transmits an influential message to the appropriate wireless end device.

While various embodiments of the present invention have been described above, it should be understood that they have been presented by way of example, and not limitation. It will be apparent to persons skilled in the relevant art(s) that various changes in form and detail can be made therein without departing from the spirit and scope of embodiments of the present invention. Thus, embodiments of the present invention should not be limited by any of the above described exemplary embodiments, but should be defined only in accordance with the following claims and their equivalents.

What is claimed is:

1. A system of tracking a shopper's use of purchased products from a store, said system comprising:
    a shopper profile for each said shopper using said system;
    an out-of-store communication network having an Internet connection;
    a wireless transportable handheld end device attachable to said out-of-store communication network, the wireless transportable handheld end device including a product scanning device configured to be used outside of the store to scan readable media associated with each of said purchased products so as to produce scanned product data; and
    a commerce server in operative communication with said wireless transportable handheld end device through said Internet and through said out-of-store communication network, whereby said commerce server receives a shopper's feedback about said shopper's use of said purchased products, said shopper's feedback being transmitted by said shopper through said wireless transportable handheld end device and whereby said wireless transportable handheld end device is used by said shopper to receive information from said commerce server and to transmit information to said commerce server, wherein the product scanning device is further configured to scan product coupons to produce scanned coupon data.

2. The system of claim 1 wherein each said shopper profile is stored onto said commerce server.

3. The system of claim 1 wherein said out-of-store communication network is located in a shopper's home.

4. The system of claim 1 wherein said commerce server is positioned within a store.

5. The system of claim 1 wherein said commerce server is positioned outside of a store.

6. The system of claim 1, wherein said readable media of each said purchased product is read by said scanning device when activated by said shopper, said scanned readable media being placed within an electronic information packet.

7. The system of claim 6 wherein said electronic information packet is stored on said wireless transportable handheld end device.

8. The system of claim 6 wherein said electronic information packet is transmitted to said commerce server through said out-of-store communication network.

9. The system of claim 8 wherein each said electronic information packet is stored on said commerce server.

10. The system of claim 9 wherein said commerce server assigns each said electronic information packet to each said shopper profile.

11. The system of claim 8 wherein said commerce server analyzes each said electronic information packet to determine the opportunity to influence one or more future purchases of said shopper.

12. The system of claim 11 wherein said commerce server selects one or more influential messages for each said purchased product scanned by said shopper.

13. The system of claim 12 wherein said commerce server transmits said one or more influential messages, selected by said commerce server in accordance with said shopper profile, to said wireless transportable handheld end device used by said shopper.

14. The system of claim 13 wherein each said one or more influential messages comprises content data selected from the group consisting of a competitive saving opportunity, a co-branding opportunity, a product warning, a product combination warning, a product review, a response to a historical progression, an alternative choice for product purchase, in-retail establishment directions to locate a product, and an electronic coupon.

15. The system of claim 13 wherein said one or more influential messages are selected from the group consisting of a text message, a video, an electronic photograph, an illustration, a hyperlink and an audio message.

16. The system of claim 1, wherein the wireless transportable handheld end device transmits the scanned product data to the commerce server; and wherein responsive to receiving the scanned product data, the commerce server transmits a request for user feedback to the wireless transportable handheld end device.

17. The system of claim 16, wherein the user feedback comprises opinion of the purchased products after use of the purchased products.

18. The system of claim 1, wherein the wireless transportable handheld end device sends the scanned product data associated with the purchased products to the commerce server, and wherein the commerce server selects one or more influential messages to send to the wireless transportable handheld end device based on the scanned product data associated with the purchased products.

19. The system of claim 18, wherein the commerce server selects the one or more influential messages to send to the wireless transportable handheld end device further based on the shopper's feedback about the shopper's use of said purchased products.

20. The system of claim 1, wherein the shopper profile includes the scanned coupon data and the scanned product data.

* * * * *